(12) United States Patent
Kartheuser et al.

(10) Patent No.: US 9,920,657 B2
(45) Date of Patent: Mar. 20, 2018

(54) AID DEVICE

(71) Applicant: SIEMENS AKTIENGESELLSCHAFT, München (DE)

(72) Inventors: Frank Kartheuser, Mühlberg/Elbe (DE); Jean Klave, Berlin (DE); Kay Krabiell, Hohen Neuendorf (DE)

(73) Assignee: SIEMENS AKTIENGESELLSCHAFT (DE)

( * ) Notice: Subject to any disclaimer, the term of this patent is extended or adjusted under 35 U.S.C. 154(b) by 383 days.

(21) Appl. No.: 14/439,379

(22) PCT Filed: Oct. 1, 2013

(86) PCT No.: PCT/EP2013/070430
§ 371 (c)(1),
(2) Date: Apr. 29, 2015

(87) PCT Pub. No.: WO2014/067736
PCT Pub. Date: May 8, 2014

(65) Prior Publication Data
US 2015/0292364 A1    Oct. 15, 2015

(30) Foreign Application Priority Data

Oct. 30, 2012  (EP) .................................. 12190629

(51) Int. Cl.
| | |
|---|---|
| *F01D 25/28* | (2006.01) |
| *B23P 19/04* | (2006.01) |
| *B23Q 1/25* | (2006.01) |
| *B23Q 1/03* | (2006.01) |
| *B23Q 3/00* | (2006.01) |
| *B23Q 1/00* | (2006.01) |
| *F01D 25/24* | (2006.01) |

(52) U.S. Cl.
CPC ............ *F01D 25/285* (2013.01); *B23P 19/04* (2013.01); *B23Q 1/00* (2013.01); *B23Q 1/03* (2013.01);
(Continued)

(58) Field of Classification Search
CPC .... F01D 25/285; F01D 25/246; F01D 25/243; F05D 2230/68; F05D 2230/70;
(Continued)

(56) References Cited

U.S. PATENT DOCUMENTS 8,381,379 B2   2/2013   Holmes et al.
8,677,591 B2   3/2014   Corn et al.
(Continued)

FOREIGN PATENT DOCUMENTS

CN    101569989 A    11/2009
CN    102000849 A    4/2011
(Continued)

OTHER PUBLICATIONS

Notification of the First Office Action dated Sep. 14, 2015 in corresponding Chinese Patent Application No. 201380057393.3 and Search Report (with English-language translation)(totaling 12 pages).
(Continued)

*Primary Examiner* — Sarang Afzali
(74) *Attorney, Agent, or Firm* — Ostrolenk Faber LLP

(57) ABSTRACT

An aid device for mounting and/or dismantling a guide ring segment which is to be attached or is held on a support, in particular a turbine guide blade guide support of a gas turbine is disclosed. The aid device having a main body, which can be fastened releasably fastened to the guide ring segment, and having a holding device, to which a traction mechanism can be fastened releasably, wherein the holding device is configured to transmit a pulling force to the main body, which pulling force acts via the traction mechanism in an installing direction or an expelling direction of the guide ring segment.

17 Claims, 3 Drawing Sheets

(52) U.S. Cl.
CPC .............. *B23Q 1/25* (2013.01); *B23Q 3/00* (2013.01); *F01D 25/243* (2013.01); *F01D 25/246* (2013.01); *F05D 2230/68* (2013.01); *F05D 2230/70* (2013.01); *Y10T 29/49318* (2015.01); *Y10T 29/49321* (2015.01); *Y10T 29/53961* (2015.01)

(58) Field of Classification Search
CPC ......... Y10T 29/49815; Y10T 29/49826; Y10T 29/49318; Y10T 29/49312; Y10T 29/53961; B23Q 1/00; B23Q 1/03; B23Q 1/25; B23Q 3/00; B23P 11/00; B23P 19/00; B23P 19/04
See application file for complete search history.

(56) References Cited

U.S. PATENT DOCUMENTS

| | | | | |
|---|---|---|---|---|
| 8,826,520 | B1 * | 9/2014 | Spanos | ............ B23P 19/022 29/596 |
| 2009/0265908 | A1 | 10/2009 | Corn et al. | |
| 2010/0263183 | A1 | 10/2010 | Holmes et al. | |
| 2011/0103943 | A1 | 5/2011 | Küpper et al. | |

FOREIGN PATENT DOCUMENTS

| | | |
|---|---|---|
| DE | 10 2009 003 833 A1 | 10/2009 |
| EP | 2 107 219 A1 | 10/2009 |
| EP | 2 500 529 A2 | 9/2012 |
| EP | 2 535 530 A2 | 12/2012 |
| WO | WO 2005/054631 A1 | 6/2005 |

OTHER PUBLICATIONS

International Search Report dated Nov. 14, 2013 issued in corresponding International patent application No. PCT/EP2013/070430.
Written Opinion dated Nov. 14, 2013 issued in corresponding International patent application No. PCT/EP2013/070430.
European Search Report dated Apr. 15, 2013 issued in corresponding European Application No. 12 19 0629.

* cited by examiner

AID DEVICE

CROSS-REFERENCE TO RELATED APPLICATIONS

The present application is a 35 U.S.C. § § 371 national phase conversion of PCT/EP2013/070430, filed Oct. 1, 2013, which claims priority of European Patent Application No. 12190629.1, filed Oct. 30, 2012, the contents of which are incorporated by reference herein. The PCT International Application was published in the German language.

TECHNICAL FIELD

The invention relates to an aid device for installing and/or removing a guide ring segment, which is to be attached or mounted on a carrier, especially on a stator blade carrier of a gas turbine. The present invention furthermore relates to a method for installing and/or removing the guide ring segment.

TECHNICAL BACKGROUND

Within the scope of engine repair, the engines which are to be repaired are broken down into their individual components. On account of the high temperatures which prevail during operation of the engine the components which are to be removed are frequently distorted to such a great extent that they are able to be separated from each other only with a high expenditure of effort. Especially guide ring segments in the turbine module of the engine are subjected to considerable temperature fluctuations during operation of the engine.

In order to extract the guide ring segments—which are arranged in series in the circumferential direction of the turbine stator blade carrier—from said carrier, the turbine stator blade carriers are first of all broken down into their two half-shell-like elements. The guide ring segments, which are installed in grooves, are then extracted from the turbine stator blade carrier using a hammer, wedge and plastic blocks. To this end, a wedge has first of all to be driven in between two adjacent guide ring segments. Next, with the aid of the hammer, blows are applied laterally to the wedge in order to space one of the guide ring segments away from the adjacent guide ring segment. As soon as sufficient space exists between the two guide ring segments, a plastic block is inserted and the guide ring segment is extracted from the groove of the carrier by hammer blows upon the plastic block.

For installing the guide ring segments, the hammer and plastic blocks are again used in order to drive the guide ring segments into the grooves of the turbine stator blade carriers.

The disadvantage of this procedure is that the manual installation and removal involves an increased risk of injury for the worker. Moreover, the guide ring segments can be damaged as a result of the hammering despite the use of plastic blocks. The installation and removal process is also costly and time intensive.

Starting from this prior art, it is an object of the present invention to provide an aid device of the type referred to in the introduction with which the guide ring segment which is to be installed or removed is not damaged during the working process, the risk of injury for the worker is lessened and the installation and removal process is simplified.

SUMMARY OF THE INVENTION

For achieving this object, the present invention creates an aid device with a base body which can be detachably fastened on the guide ring segment and a holding device on which a pulling means can be detachably fastened, wherein the holding device is designed for transmitting a pulling force to the base body which acts via the pulling means at least in the main in an installation direction or extraction direction of the guide ring segment.

Therefore, the invention is based on the consideration of no longer solely hammering guide ring segments out the carrier but of drawing guide ring segments out of, or into, the carrier with the aid of a pulling means.

Guide ring segments do not have any separate application points to order to be able to directly attach pulling means. In this respect, the invention provides an aid device which can be fastened on the guide ring segment and in its turn has a holding device on which the pulling means can be attached. In this way, the pulling means can act indirectly on the guide ring segment via the aid device. The pulling force should in this case act upon the aid device in the installation or removal direction of the guide ring segment in order to avoid tilting of the guide ring segment during its installation or removal. It is advantageous that the aid device can be used both for installation and for removal of the guide ring segment.

Provision is preferably made on the base body for a locking unit, especially fastened in a detachable manner, which is designed for detachably fastening the base body on the guide ring segment. The locking unit is advantageously arranged on a front end face of the base body, as seen in the installation direction or extraction direction, and is designed for gripping under and/or gripping behind the guide ring segment at least in a locked state. During the removal of the guide ring segments, the guide ring segments, arranged one behind the other, are removed from the carrier or the half-shell-like turbine stator blade carrier of the row starting from one side. As a result of this procedure, the guide ring segment is freely accessible on its front end face and by its rear end face butts against the following guide ring segment. Therefore, a locking unit which is provided on the front end face of the base body can be installed in a particularly simple manner. Moreover, the aid device, as a result of the detachable arrangement of the locking unit, can be fitted on the base body at the side in a simple manner. That is to say that two locking units can be provided, wherein one locking unit is suitable for a left hand arrangement and another for a right hand arrangement on the base body in order to fit the aid device at the side in accordance with the desired installation or extraction direction of the guide ring segment.

The locking unit expediently has two jaws which can move back and forth between an inner and an outer position, wherein the jaws in an outer position engage with the guide ring segment. The jaws preferably have recesses on their outer sides pointing away from each other in order to engage in an outer position with hooks which are provided on the guide ring segment. This arrangement utilizes the hooks, provided on the underside of the guide ring segment, via which the guide ring segments are guided into grooves of the carrier and retained there. The locking unit ensures a form-fitting, tension-resistant and releasable connection in this way. It is also advantageous that the spread-apart jaws in their outer position can be pressed flat onto downward projecting hook flanks of the guide ring segment. As a result, the stability of the connection between the aid device and the guide ring segment is further improved and a turning away of the base body from the guide ring segment is avoided.

In order to be able to operate the locking unit from the outside, the locking unit has a lever mechanism which is designed for moving the jaws back and forth between the inner and the outer positions, and provision is especially made for a locking means in order to lock the lever mechanism at least in a locked state of the locking unit. Provision can be made, for example, for an externally operable lever which during operation presses a wedge-like element between the two jaws in order to move these from their inner position into an outer position.

The holding device is advantageously provided on the locking unit, especially fastened in a detachable manner. The holding device can also have an attachment eye. The pulling means can therefore be attached on the aid device in a simple manner.

Furthermore, a locating face, which can be brought into flat contact with the guide ring segment, at least in certain sections, can be formed on an underside of the base body. As a result, the aid device is easily manageable since for stabilizing the aid device the base body can be pressed manually or by means of additional aiding means against the guide ring segment. For enlarging the locating face which is in contact with the guide ring segment this can have an outer curvature corresponding to the guide ring segment.

In order to be able to attach the aid device to the elongate guide ring segments in a particularly easy manner, the base body can have an elongate basic shape.

In a development of the present invention, the base body can have at least one buffer element fixed to the base body, especially which is formed on an end face of the base body which lies opposite the holding device. Therefore, for example a hammer can be used as the impacting body in order to extract or to install the guide ring segment which is connected to the aid device without a direct contact taking place between the hammer and the guide ring segment. In this way, the guide ring segment is not damaged.

According to a further aspect of the present invention, the base body has an L-shaped basic form, wherein one member of the L-shaped base body forms a buffer element fixed to the base body. For example, the member can be formed on an end of the base body which lies opposite the holding device in order to provide a large impacting surface for a hammer.

In a further embodiment, provision is made for an impacting body which is guided in a back and forth movable manner on the base body at least in the main along the installation and extraction directions of the guide ring segment, wherein an end position of the impacting body is defined by the buffer element. In this way, a guided impacting body can be connected to the guide ring segment in such a way that an impulse of the impacting body is transferred to the guide ring segment in order to extract the guide ring segment from a carrier or to insert the guide ring segment into this. In this case, the impacting body can be moved back and forth at least in the main along the installation or extraction direction of the guide ring segment in order to avoid tilting of the guide ring segment. Specifically, the impulse of the impacting body acting in the extraction direction is first of all transmitted to the base body by the impacting body being moved manually forward with full force from its retracted position into its end position and being impacted against the buffer element fixed on the base body. The impulse which is transmitted to the base body is relayed to the guide ring segment which is fastened on the base body. The impacting body is then manually retracted again and impacted against the buffer element once again. In this way, the guide ring segment which is mounted on the carrier is extracted from or inserted into the carrier. By increasing the impacting weight and/or increasing the pull-back distance and/or increasing the acceleration of the impacting body, the impulse of the impacting weight upon the guide ring segment can be correspondingly increased. Accordingly, if a reduction of the impulse is desired, the impacting weight and/or the pull-back distance and/or acceleration of the impacting body can be decreased.

Furthermore, the base body can have a U-shaped basic form. In this case, provision can be made for a guide bar between the two U-members which connects the two members and on which the impacting body is guided. It is advantageous that the impacting body between the two members is easily accessible from the outside in order the move the impacting body back and forth and above all to be able to forcefully impact against the buffer element. Moreover, this embodiment is very stable since the guide bar is supported on both sides so that even comparatively heavy impacting bodies can be used.

The member which is arranged at the front in the installation or extraction direction expediently forms the buffer element and/or the member which is arranged at the rear defines a pull-back position. Therefore, the aid device can be used in the extraction or installation direction both for removing and for installing the guide ring segment since each of the two members can serve as a buffer element.

Provision is preferably made on the base body for a guide unit, especially fastened in a detachable manner, which is designed in order to guide the base body in its position relative to the guide ring segment during installation or removal of said guide ring segment. By means of the guide unit, the aid device is retained in its position relative to the guide ring segment. It is advantageous that as a result even comparatively heavy aid devices are simple to manage. Without the guide unit, the aid device, depending on the position of the carrier, would have to be held manually on the guide ring segment with a high expenditure of effort. Therefore, the aid device can also be used in a simple manner on a carrier lying on its side. As a result of the detachable arrangement of the guide unit on the aid device the aid device is maintenance friendly. Moreover, forces acting upon the base body which deviate from the extraction or installation direction of the guide ring segment can be absorbed by the guide unit and kept away from the guide ring segment.

In order to provide a particularly reliable and simply manageable guiding of the aid device, the guide unit can have at least one guide rail which is mounted on the base body and designed in order to engage in a groove of the carrier, extending parallel to the guide ring segment which is to be installed or removed, and to be guided in this groove in a movable manner.

So that the guide unit can move particularly smoothly in the groove extending parallel to the guide ring segment which is to be removed, the guide rail can carry rollers on its end section pointing towards the groove, especially wherein the guide rail carries rollers at least on its end section which is to be brought into engagement with the groove. By means of the rollers which run in the groove, the guide rail can slide in the groove in an accurately fitting manner. For example, additional rollers are mounted on the guide rail outside of the groove and run on the carrier upper side adjacent to the groove in order to enable an additional support of the guide rail in relation to the carrier.

The subject matter of the present invention furthermore relates to a method for installing and/or removing a guide ring segment which is to be attached or mounted on a carrier, especially on a stator blade carrier of a gas turbine, in which method the previously described aid device, by a locating face provided on its underside, is brought into contact with an outer side of the guide ring segment pointing away from the carrier, the aid device is detachably fastened on the guide ring segment, a holding device, especially an attachment eye, is detachably fastened on the base body at the front, as seen in the installation or extraction direction, a pulling means, especially a cable, is connected to the holding device, especially to the attachment eye, and the pulling means is tensioned in order to draw the aid device in the installation direction or extraction direction.

In order to be able to guide the pulling means onto the aid device from the outside in a simple manner, a deflection means, especially an additional attachment eye, can be fastened on the carrier in front of the aid device in the extraction or installation direction in order to deflect a pulling force applied by the pulling means in the installation or extraction direction.

Furthermore, by means of at least one impacting body an impact can be applied against a buffer element fixed on the base body in order to transmit with each blow an impulse of the impacting body via the base body onto the guide ring segment in the installation or extraction direction. As a result, an impulse can momentarily be transmitted to the guide ring segment if the guide ring segment becomes jammed, for example, during installation or removal.

A hammer can be used in the simplest way as the impacting body, wherein the impacting body is especially impacted against the buffer element fixed on the base body.

According to a further aspect of the present invention, use can be made of an impacting weight which is guided on the base body along the installation direction or extraction direction and is moved forwards and backwards, wherein the impacting body, during the forward movement, is impacted against the buffer element fixed on the base body. As a result of the guiding of the impacting body, the risk of injury to the worker operating the aid device is lessened.

A guiding means fastened on the base body is advantageously at least partially inserted in a groove of the carrier extending parallel to the guide ring segment which is to be extracted or installed in order to support the aid device in its position relative to the guide ring segment and to guide the aid device along the installation or extraction direction. Consequently, even comparatively heavy aid devices are easy to operate.

BRIEF DESCRIPTION OF THE DRAWINGS

With regard to further advantageous embodiments of the invention reference is to be made to the dependent claims and also to the following description of an exemplary embodiment with reference to the attached drawing. In the drawing

DESCRIPTION OF EMBODIMENTS

Figure 1:
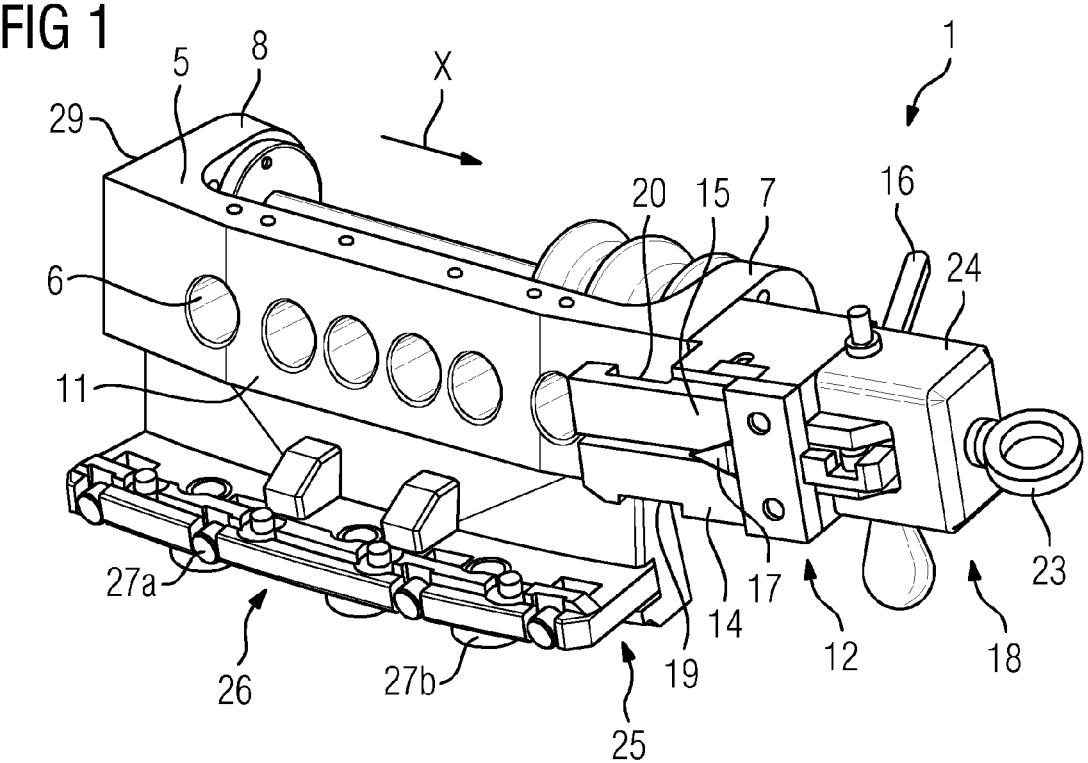
FIG. 1 shows an aid device according to an exemplary embodiment of the present invention in plan view.

Shown in the drawing is an aid device 1 according to an embodiment of the present invention. The aid device 1 serves both for installing and for removing a guide ring segment 2 which is mounted on a carrier 3, in this case on a stator blade carrier of a gas turbine. In the following text, the aid device 1 is explained based on the removal of a guide ring segment 2, wherein by means of the aid device 1 the guide ring segment 2 can be extracted from the carrier 3 not only in the extraction direction X but for installation can also be drawn into the carrier 3 in the installation direction opposite to the extraction direction X.

Figure 4:
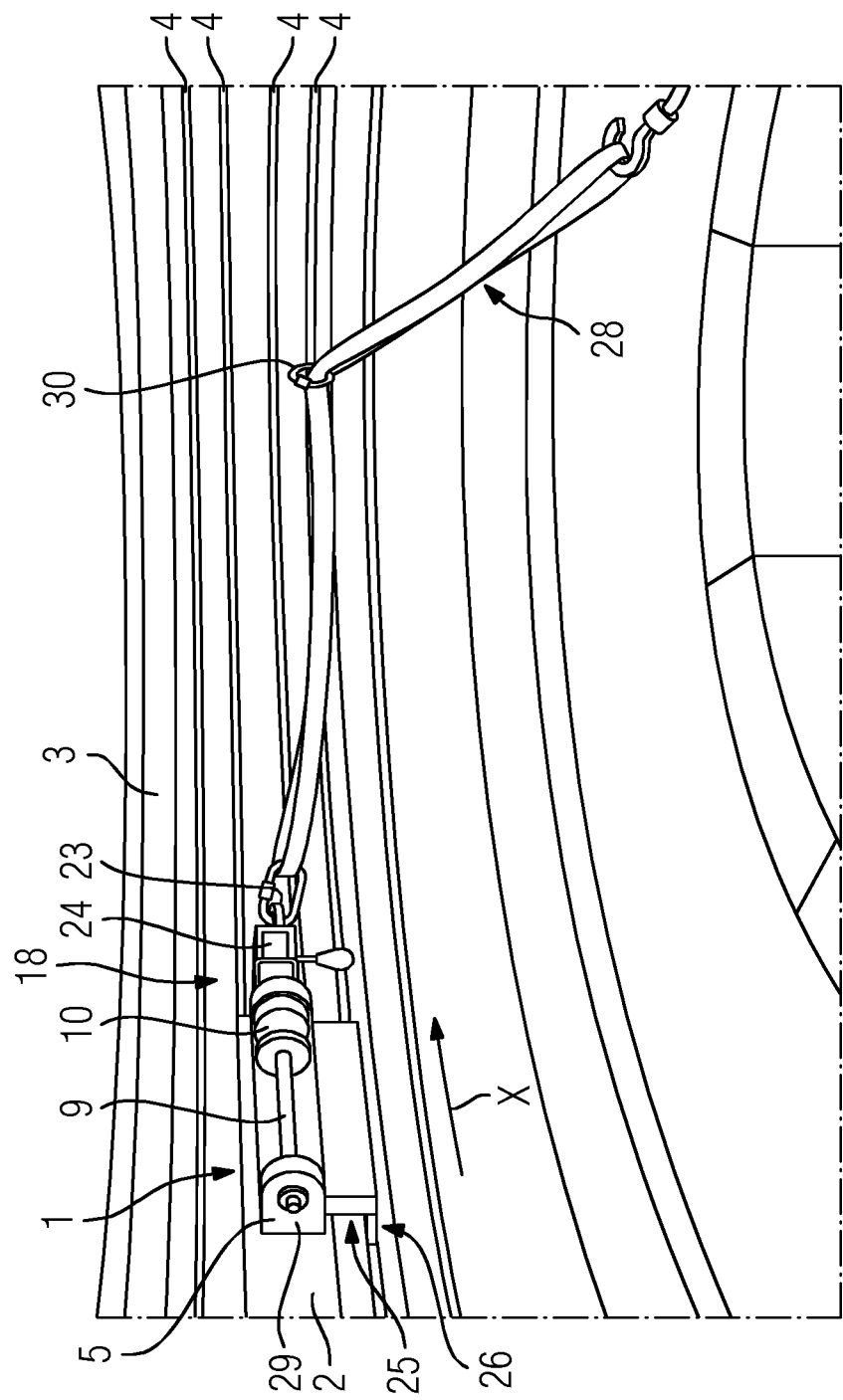
FIG. 4 shows the aid device from FIG. 1 in the fastened state with a pulling means fastened thereon in a simplified perspective view.

In FIG. 4, it can be easily seen that the turbine stator blade carrier 3 is of a half-shell-like design and in the circumferential direction has a plurality of grooves 4 extending parallel to each other. A plurality of stator blade rows—not shown—are arranged in the grooves 4 next to each other, wherein a plurality of guide ring segments 2, arranged in series, are inserted in a groove 4 in each case between two stator blade rows.

Figure 2:
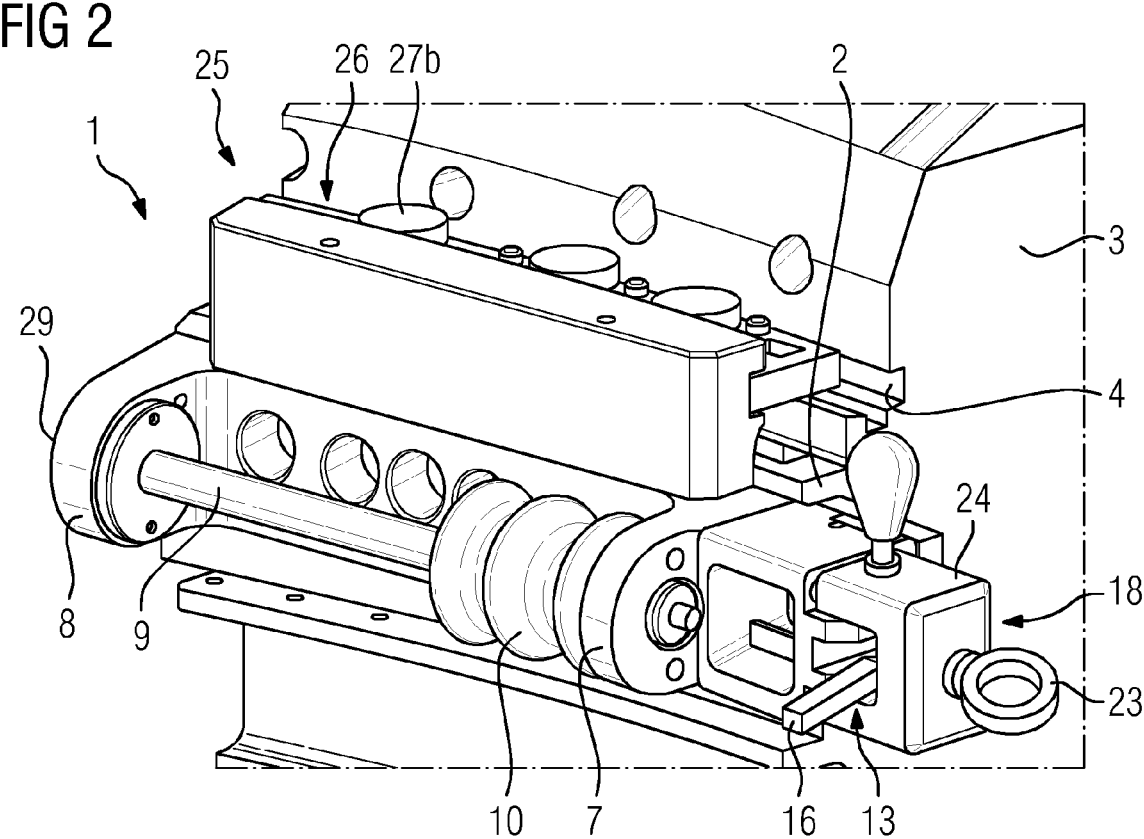
FIG. 2 shows the aid device from FIG. 1 in the fastened state in plan view.

The aid device 1 has an elongate base body 5 consisting of a solid material and for weight reduction has a multiplicity of holes 6—see in particular FIG. 1. The base body 5 is of U-shaped design and between its two members 7, 8 fixed to the base body supports a guide bar 9. On the guide bar 9, an impacting body 10 is guided in a back and forth movable manner along an extraction direction, identified by the arrow X, of the guide ring segment 2. The member 7 which is shown on the right in FIG. 2 is designed as a buffer element and defines an end position of the impacting body 10. The opposite member which is shown on the left delimits a maximum pull-back position for the impacting body 10. Furthermore, on the end face of the base body, 5 which is on the left in FIG. 2, an additional buffer element 29 is formed on the outer side. A locating face 11, which can be brought into flat contact with the guide ring segment 2, at least in certain sections, is formed on an underside of the base body 5.

Similarly, the aid device 1 can also be used for the removal of the guide ring segment 2 in a direction opposite to the extraction direction, indicated by the arrow X, for removing the guide ring segment 2. The member 8 shown on the left then correspondingly forms the buffer element and the right-hand member 7 delimits the maximum pull-back position of the impacting body 10.

Figure 3:
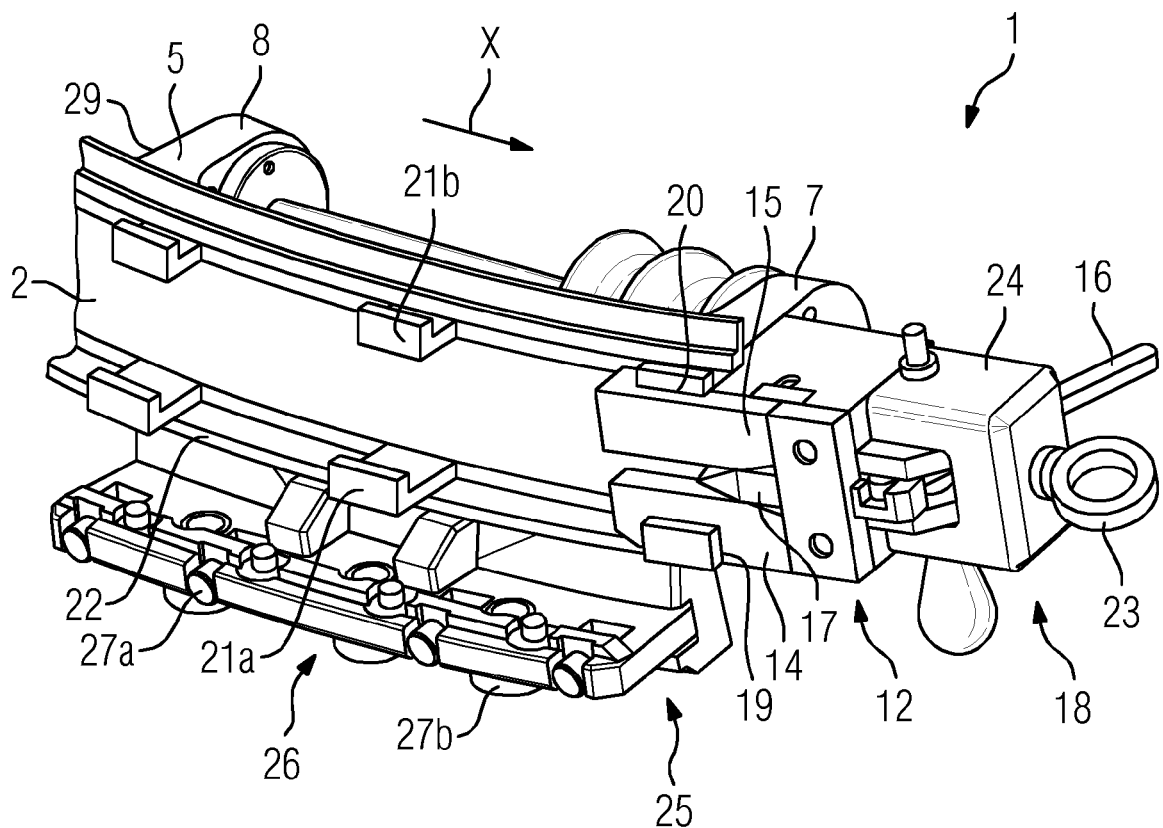
FIG. 3 shows the aid device from FIG. 1 fastened on a guide ring segment in plan view.

A locking unit 12, which is arranged on a front end face of the base body 5, as seen in the extraction direction X, is detachably fastened on the base body 5. The locking unit 12 specifically has a lever mechanism 13 which interacts with two jaws 14, 15 which grip beneath the guide ring segment 2. The lever 16 which is mounted on its lower end is in functional communication with a wedge-like mandrel 17. In the released state of the lever 16 shown in FIG. 1, the mandrel 17 is drawn back and the jaws 14, 15 are located in their inner position, i.e. the locking unit 12 is unlocked. In the pulled state of the lever 16 the mandrel 17, as can be easily seen in FIG. 3, is pressed between the two jaws 14, 15 and spreads these into their outer position, as a result of which the base body 5 is fastened on the guide ring segment 2. Furthermore, provision is made for a locking pin, not shown, which locks the lever 16 in its pulled state.

In FIG. 3, it can be easily seen that the jaws 14, 15 on their outer sides have recesses 19, 20 which engage with hooks 21a, 21b which are formed on the guide ring segment 2 on the underside. The hooks 21a, 21b are specifically of L-shaped design and arranged symmetrically to each other.

The hooks 21a have one member, projecting perpendicularly from the guide ring segment 2, which is of longer design than that of the hooks 21b, i.e. the hooks 21a are higher than the hooks 21b. In FIGS. 1 and 3, it can be seen that the recess 19 extends over the entire depth of the jaw 14 in order to accommodate in a form-fitting manner the member of the hooks 21a which projects perpendicularly from the guide ring segment 2. In the locked state of the jaws 14, 15, as is shown in FIG. 3, the horizontal member of the hooks 21a then comes into flat contact with the underside of the jaw 14. In contrast, the jaw 15 is recessed only up to about its mid-depth point in order to accommodate the smaller hook 21b in a form-fitting manner. Furthermore, the spread-apart jaw 14 in its outer position comes into flat contact by its outer side with a hook flank 22 of the guide ring segment 2.

Furthermore, a holding device 18 with an attachment eye 23 is provided on the locking unit 12. The attachment eye 23 is screwed into a U-shaped intermediate piece 24 which is detachably fastened on the front side of the locking unit 12.

Depending on the direction in which the guide ring segment 2 is to be extracted or installed, the locking unit 12 can be attached together with the holding device 18 on the left-hand side or right-hand side of the aid device 1 in order to correspondingly fit the aid device 1 at the side.

Furthermore, a guide unit 25 is mounted on the base body 5. The guide unit 25 has a side-mounted guide rail 26 which is designed in order to engage in the groove 4 of the carrier 3 which extends parallel to the guide ring segment 2 which is to be removed and in order to be movably guided in this groove. The guide unit 25 can also have two equally sized guide rails 26. On its end section which engages in the groove 4 the guide rail 26 carries rollers 27a which are arranged on the underside of the guide rail 26 transversely to the extraction direction X. The diameter of the rollers 27a is approximately as large as the width of the groove 4. Furthermore, rollers 27b, the diameter of which is larger than that of the rollers 27a, are arranged on the outer side of the guide rail 26 pointing away from the base body. The rollers 27b come into contact with the outer side of the carrier 3 when the aid device 1 is fastened on the guide ring segment 2 which is mounted on the carrier 3. As a result of the rollers 27a, 27b, the guide unit 25 can be moved more easily in the curved carrier 3.

In FIG. 4, it can be easily seen that for removing the guide ring segment 2, which is mounted on the carrier 3, in this case on a stator blade carrier of a gas turbine, the guide rail 26 which is mounted on the aid device 1 is inserted into the groove 4 of the carrier 3 which extends parallel to the guide ring segment 2. The aid device 1 is then guided up to the guide ring segment 2 which is to be removed.

There, the locating face 11 which is provided on the underside of the base body 5 is brought into contact with an outer side of the guide ring segment 2 pointing away from the carrier 3. After this, the locking mechanism 12 is operated by pulling on the lever 16. By operating the lever 16, the mandrel 17 is pressed between the two jaws 14, 15 and spreads these from their inner position into their outer position. The two jaws 14, 15 in the region of their recesses 19, 20 engage with the hooks 21a, 21b of the guide ring segment 2. Also, the jaw 14 is pressed against the hook flank 22 of the guide ring segment 2. In order to prevent an inadvertent release of the lever mechanism 13, the locking pin is pressed, as a result of which the lever 16 is locked in its pulled position.

The cable 28 is now connected to the attachment eye 23 which is arranged on the end of the aid device 1 pointing away from the guide ring segment 2. The cable 28 is positioned along the extraction direction X of the guide ring segment 2. If, as shown here in FIG. 4, the space is insufficient for this, an additional attachment eye 30 is attached as a deflection means on the carrier 3 in front of the guide ring segment 2 in the extraction direction X in order to be able to arrange the cable 28 outside of the extraction direction X.

The cable 28 is then tensioned and exerts a pulling force on the aid device 1 along the extraction direction X. The pulling force is transmitted to the guide ring segment 2 via the base body 5 which is fastened on said guide ring segment 2. As soon as the pulling force exceeds the frictional resistance between the guide ring segment 2 and the carrier 3, the guide ring segment 2 is drawn out of the groove 4 of the carrier 3 in the extraction direction X.

If the guide ring segment 2 should be locked in the groove 4 in the meantime, an impulse, or a number of impulses, can be transmitted via the base body 5 to the guide ring segment 2 by forceful striking of the impacting body 10 against the member 7. If the maximum impulse which can be achieved with this—which is limited by the mass of the impacting weight, the maximum pull-back length between the two members 7, 8 and the maximum achievable acceleration of the impacting body 10—should be insufficient, blows can be applied to the buffer element 29 by means of a hammer.

The impact forces and pulling forces which in this case act upon the base body 5 and deviate from the extraction direction X of the guide element 2 are absorbed in the guide unit 25 and kept away from the jaws 14, 15, which are hooked in the guide ring segment 2 in a form-fitting manner, in order to minimize as far as possible a bending moment acting upon the guide ring segment 2.

When the guide ring segment 2 has been extracted via the end of the groove 4 of the turbine stator blade carrier 3, it can be withdrawn.

Although the invention has been illustrated and described in more detail by means of the preferred exemplary embodiment, the invention is not limited by the disclosed examples and other variations can be derived therefrom by the person skilled in the art without the departing from the extent of protection of the invention.

What is claimed is:

1. An aid device for installing or removing a guide ring segment wherein the segment is configured to be at least one of attached or mounted on a stator blade carrier of a gas turbine, the aid device comprising:
   a base body configured to be detachably fastened on the guide ring segment;
   a holding device comprising a holder configured to cooperate with a puller to be detachably fastened to the holding device,
   wherein the holding device is configured for transmitting a pulling force to the base body, wherein the holding device is urged via the holder by the puller in an installation direction when installing the guide ring segment or in an extraction direction when removing the guide ring segment;
   the base body comprises a locking unit fastened in a detachable manner and configured for detachably fastening the base body on the guide ring segment,
   wherein the base body has an L-shaped basic form, wherein one member of the L-shaped base body forms a buffer element fixed to the base body; and
   an impacting body guided in a back and forth movable manner on the base body at least along one of the installation direction and the extraction direction of the guide ring segment,
   wherein an end position of the impacting body comprises the buffer element.

2. The aid device as claimed in claim 1, wherein the L-shaped base body forms a part of a U-shaped basic form.

3. The aid device as claimed in claim 2, wherein the U-shaped base body comprises a guide bar located between and configured to connect two members forming part of the U-shaped base body, wherein the impacting body is guided along the guide bar.

4. The aid device as claimed in claim 3, wherein at least one of the two members forming part of the U-shaped base body forms the buffer element and is positioned at the front of the base body in the installation direction during the installing or in the extraction direction during removing, and the other one of the two members forming part of the U-shaped base body is arranged at the rear and defines a pull-back position.

5. The aid device as claimed in claim 1, wherein the locking unit is arranged on a front end face of the base body, as seen in the installation direction when installing the guide ring segment or in the extraction direction when removing the guide ring segment, and the locking unit is configured for gripping at least one of beneath and behind the guide ring segment at least in a locked state of the locking unit.

6. The aid device as claimed in claim 5, wherein the locking unit comprises two opposing jaws configured to move back and forth between an inner position not engaging the guide ring segment and an outer position engaging the guide ring segment.

7. The aid device as claimed in claim 1, wherein the holding device is provided on the locking unit and is fastened thereto in a detachable manner.

8. The aid device as claimed in claim 1, wherein the holding device comprises an attachment eye for the puller.

9. The aid device as claimed in claim 1, further comprising a locating face, which can be brought into flat contact with the guide ring segment, at least in certain sections, and formed on an underside of the base body.

10. The aid device as claimed in claim 1, wherein the base body comprises an elongate basic shape.

11. The aid device as claimed in claim 1, wherein the base body comprises at least one buffer element fixed on an end face of the base body opposite the holding device.

12. The aid device as claimed in claim 1, wherein the base body comprises a guide unit fastened in a detachable manner, the guide unit being configured to guide a position of the base body relative to the guide ring segment during at least one of the installation and the removal of the guide ring segment.

13. The aid device as claimed in claim 1, further comprising a guide bar configured to guide the impacting body along the guide bar.

14. An aid device for installing or removing a guide ring segment wherein the segment is configured to be at least one of attached or mounted on a stator blade carrier of a gas turbine, the aid device comprising:
a base body configured to be detachably fastened on the guide ring segment;
a holding device comprising a holder configured to cooperate with a puller to be detachably fastened to the holding device,
wherein the holding device is configured for transmitting a pulling force to the base body, wherein the holding device is urged via the holder by the puller in an installation direction when installing the guide ring segment or in an extraction direction when removing the guide ring segment;
the base body comprises a locking unit fastened in a detachable manner and configured for detachably fastening the base body on the guide ring segment;
wherein the locking unit is arranged on a front end face of the base body, as seen in the installation direction when installing the guide ring segment or in the extraction direction when removing the guide ring segment, and the locking unit is configured for gripping at least one of beneath and behind the guide ring segment at least in a locked state of the locking unit,
wherein the locking unit comprises two opposing jaws configured to move back and forth between an inner position not engaging the guide ring segment and an outer position engaging the guide ring segment;
hooks formed on the guide ring segment; and
the jaws comprise recesses on a respective outer side of each jaw, the recesses pointing away from each other and being configured to engage in the outer position with hooks formed on the guide ring segment.

15. The aid device as claimed in claim 14, wherein the locking unit comprises:
a lever mechanism configured and operable for moving the jaws back and forth between the inner position and the outer position, and
a locking mechanism configured to lock the lever mechanism at least in a locked state of the locking unit.

16. An aid device for installing or removing a guide ring segment wherein the segment is configured to be at least one of attached or mounted on a stator blade carrier of a gas turbine, the aid device comprising:
a base body configured to be detachably fastened on the guide ring segment;
a holding device comprising a holder configured to cooperate with a puller to be detachably fastened to the holding device,
wherein the holding device is configured for transmitting a pulling force to the base body, wherein the holding device is urged via the holder by the puller in an installation direction when installing the guide ring segment or in an extraction direction when removing the guide ring segment; and
the base body comprises a locking unit fastened in a detachable manner and configured for detachably fastening the base body on the guide ring segment,
wherein the base body comprises a guide unit fastened in a detachable manner, the guide unit being configured to guide a position of the base body relative to the guide ring segment during at least one of the installation and the removal of the guide ring segment,
wherein the guide unit has at least one guide rail mounted on the base body and configured to engage in a groove of the stator blade and to be movably guided in the groove, wherein the groove extends parallel to the guide ring segment.

17. The aid device as claimed in claim 16, wherein the guide rail comprises rollers on an end section of the guide rail pointing towards the groove, wherein the rollers at least on the end section are configured to be brought into engagement with the groove.

* * * * *